United States Patent
Wang et al.

(10) Patent No.: US 12,535,182 B2
(45) Date of Patent: Jan. 27, 2026

(54) SHOULDER RIG AND PHOTOGRAPHIC DEVICE

(71) Applicant: SHENZHEN NEEWER TECHNOLOGY CO. LTD, Shenzhen (CN)

(72) Inventors: Jun Wang, Shenzhen (CN); Yan Ke, Shenzhen (CN)

(73) Assignee: SHENZHEN NEEWER TECHNOLOGY CO. LTD, Shenzhen (CN)

(*) Notice: Subject to any disclaimer, the term of this patent is extended or adjusted under 35 U.S.C. 154(b) by 185 days.

(21) Appl. No.: 18/488,241

(22) Filed: Oct. 17, 2023

(65) Prior Publication Data
US 2025/0075852 A1 Mar. 6, 2025

(30) Foreign Application Priority Data

Aug. 30, 2023 (CN) .......................... 202322358619.7

(51) Int. Cl.
G03B 17/56 (2021.01)
F16M 13/04 (2006.01)
F16M 11/04 (2006.01)
F16M 11/12 (2006.01)

(52) U.S. Cl.
CPC ........... *F16M 13/04* (2013.01); *G03B 17/561* (2013.01); *F16M 11/043* (2013.01); *F16M 11/12* (2013.01)

(58) Field of Classification Search
CPC .... G03B 17/56; G03B 17/561; G03B 17/563; G03B 17/566; F16M 13/00; F16M 13/02; F16M 13/022; F16M 13/04; F16M 13/041; F16M 13/043; F16M 13/048; F16M 11/2042; F16M 11/121; F16M 2200/047; F16M 2200/048
See application file for complete search history.

(56) References Cited

U.S. PATENT DOCUMENTS

2012/0160980 A1* 6/2012 Wang ..................... F16M 13/04
  248/161
2015/0288858 A1* 10/2015 Fee ....................... F16M 11/041
  348/376

* cited by examiner

Primary Examiner — Stephanie E Bloss
Assistant Examiner — Fang-Chi Chang
(74) Attorney, Agent, or Firm — Westbridge IP LLC

(57) ABSTRACT

Disclosed are a shoulder rig and a photographic device, relating to the technical field of photographic equipment. The shoulder rig includes a main bracket and a battery bracket. One end of the main bracket is provided with two handles, an upper side of the main bracket is configured to support a camera, and a back side of the main bracket is configured to be put on a shoulder. The battery bracket is movably provided on another end of the main bracket and the battery bracket is configured to install a battery pack.

7 Claims, 6 Drawing Sheets

SHOULDER RIG AND PHOTOGRAPHIC DEVICE

CROSS-REFERENCE TO RELATED APPLICATIONS

This application claims priority to Chinese Patent Application No. 202322358619.7, filed on Aug. 30, 2023, the entire contents of which are incorporated herein by reference.

TECHNICAL FIELD

The present application relates to the technical field of photographic equipment, in particular to a shoulder rig and a photographic device.

BACKGROUND

When using the camera, due to the heavy weight of the camera, it is not conducive to maintaining the stability of the camera only by holding it. In the prior art, the user will install the camera on the shoulder rig device and place the shoulder rig device on the shoulder to achieve the stability of the camera through hands and shoulders. At present, the battery pack used by the camera is often installed on the shoulder rig. However, when the user uses the above-mentioned camera, the battery pack fixed on the shoulder device easily interferes with objects in the external environment, causing that the user cannot shoot from the desired shooting direction and shooting position, which leads to a poor user experience.

SUMMARY

The main objective of the present application is to provide a shoulder rig, aiming to movably install the batteries used to install the battery pack on the main bracket, such that the direction and position of the battery pack can be adjusted on the main bracket to avoid relevant obstacles in the environment, which avoids any disturbance on the use of the camera and improves the user experience.

In order to achieve the above mentioned purposes, the present application provides a shoulder rig, including:
  a main bracket, one end of the main bracket being provided with two handles, an upper side of the main bracket being configured to support a camera, and a back side of the main bracket being configured to be put on a shoulder; and
  a battery bracket movably provided on another end of the main bracket, the battery bracket being configured to install a battery pack.

In some embodiments, the battery bracket is rotatably connected to the main bracket.

In some embodiments, the battery bracket includes a first rotary shaft, an installation portion and a lock piece;
  the first rotary shaft passes through the installation portion, and two ends of the first rotary shaft are fixed to the main bracket;
  the installation portion is rotatable relative to the first rotary shaft;
  the installation portion is provided with a lock groove, the first rotary shaft is exposed in the lock groove, and the lock piece is movably mounted in the lock groove to have a locked state for locking the first rotary shaft or an unlocked state for loosening the first rotary shaft, and the installation portion is configured to install the battery pack.

In some embodiments, the lock piece includes a pressure plate and a screw rod;
  one end of the screw rod is provided with a knob, another end of the screw rod is connected to the installation portion after passing through the pressure plate, and the knob is abutted against a side of the pressure plate back away from the installation portion; and
  when the lock piece is in the locked state, the pressure plate presses against the first rotary shaft; and when the lock piece is in the unlocked state, the pressure plate releases the first rotary shaft.

In some embodiments, the lock piece further includes a spring provided between the pressure plate and the lock groove to make the pressure plate have a tendency to move away from the installation portion.

In some embodiments, the installation portion is provided with a limiting hole;
  a movable fastening piece passes through the limiting hole, one end of the fastening piece is fixed to the pressure plate, and another end of the fastening piece is provided with a limiting protrusion;
  the limiting hole includes a connection section and a limiting section; and
  the limiting protrusion is movably provided in the limiting section, an inner diameter of the limiting section is greater than an inner diameter of the connection section, and a diameter of the limiting protrusion is greater than the inner diameter of the connection section and less than the inner diameter of the limiting section.

In some embodiments, the installation portion is provided with a limiting hole;
  a movable fastening piece passes through the limiting hole, one end of the fastening piece is fixed to the pressure plate, and another end of the fastening piece is provided with a limiting protrusion;
  the limiting hole includes a connection section and a limiting section; and
  the limiting protrusion is movably provided in the limiting section, an inner diameter of the limiting section is greater than an inner diameter of the connection section, and a diameter of the limiting protrusion is greater than the inner diameter of the connection section and less than the inner diameter of the limiting section.

In some embodiments, the installation portion includes a connection portion, a fixation bracket and a second rotary shaft;
  the first rotary shaft passes through an end of the connection portion, and the connection portion is rotatable relative to the first rotary shaft;
  the second rotary shaft passes through another end of the connection portion, two ends of the second rotary shaft are fixed to the fixation bracket, and the connection portion is rotatable relative to the second rotary shaft;
  the lock groove is provided at the connection portion, and the second rotary shaft is exposed in the lock groove;
  when the lock piece is in the locked state, the lock piece locks the second rotary shaft; and when the lock piece is in the unlocked state, the lock piece releases the second rotary shaft; and
  the fixation bracket is configured to fix the battery pack.

In some embodiments, the lock piece includes a pressure plate and a screw rod,
  one end of the screw rod is provided with a knob, another end of the screw rod is connected to the connection portion after passing through the pressure plate, and the knob is abutted against a side of the pressure plate back away from the connection portion; and when the lock piece is in the locked state, the pressure plate presses against the first rotary shaft and the second rotary shaft simultaneously; and when the lock piece is in the unlocked state, the pressure plate releases the first rotary shaft and the second rotary shaft simultaneously.

In some embodiments, at least one of the first rotary shaft and the second rotary shaft is sleeved with a damping ring, each of two ends of the connection portion is provided with a through hole;

a damping ring of the first rotary shaft is abutted against an inner wall of a corresponding through hole of the connection portion, and/or a damping ring of the second rotary shaft is abutted against an inner wall of a corresponding through hole of the connection portion; and the connection portion is rotatable relative to the first rotary shaft and/or the second rotary shaft.

The present application further provides a photographic device including a camera and the shoulder rig. The camera is movably provided on the upper side of the main bracket.

In the present application, the battery bracket provided on the main bracket is movable relative to the main bracket, such that the battery pack on the battery bracket can move relative to the camera on the main bracket. Since the shooting environment of the user is complex and changeable, the user can adjust the position of the battery bracket relative to the main bracket or the camera according to the position of the obstacles in the shooting environment. In this way, the disturbance of the battery pack by obstacles in the environment may be avoided and the camera may be put in the desired shooting position and shooting direction. Meanwhile the user can adjust the shooting position of the camera more conveniently, thereby improving the user experience.

BRIEF DESCRIPTION OF THE DRAWINGS

In order to more clearly illustrate the technical solutions in the embodiments of the present application or in the related art, drawings in the embodiments or in the related art will be briefly described below. Obviously, the drawings in the following description are only some embodiments of the present application. Other drawings can be obtained by those skilled in the art according to the structures shown in the drawings without creative work.

Figure 1:
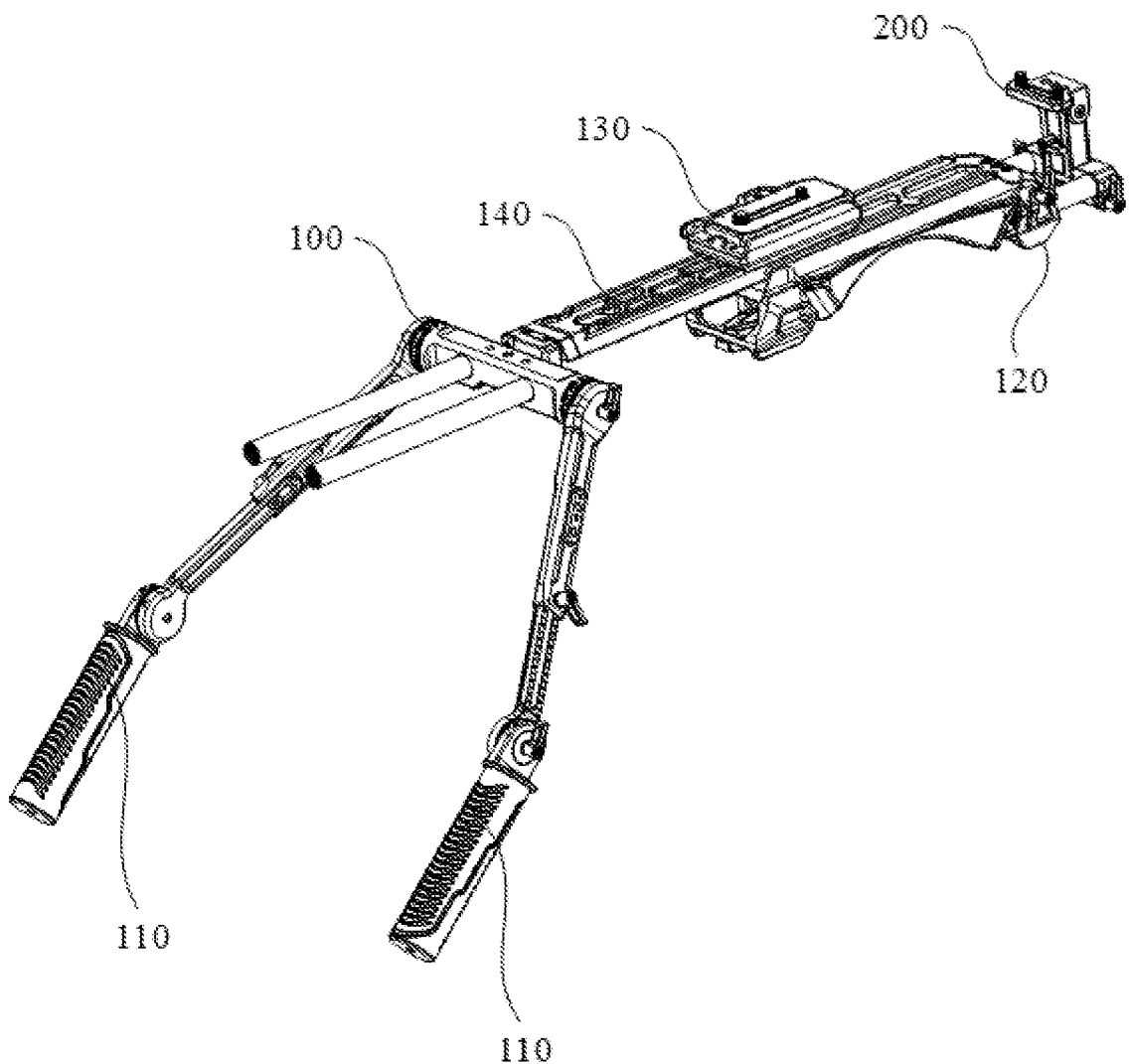
FIG. 1 is a schematic structural view of a shoulder rig according to some embodiments of the present application.

The realization of the purpose, functional characteristics and advantages of the present application will be further described with reference to the attached drawings in combination with embodiments.

DETAILED DESCRIPTION OF THE EMBODIMENTS

The technical solutions of embodiments of the present application will be clearly and completely described with reference to the drawings of the present application. Obviously, the described embodiments are only some rather than all of the embodiments of the present application. Based on the embodiments of the present application, all other embodiments obtained by those skilled in the art without creative efforts shall fall within the scope of the present application.

It should be noted that all directional indicators (such as up, down, left, right, front, rear, etc.) in the embodiments of the present application are only used to explain the relative positional relationship, movement situation, etc. among components in a specific attitude (as shown in the drawings). If the specific attitude changes, the directional indication also changes accordingly.

In addition, the descriptions related to "first", "second" and the like in the present application are merely for descriptive purposes, and should not be understood as indicating or implying their relative importance or implicitly indicating the number of technical features indicated. Therefore, the features defined by "first" and "second" may explicitly or implicitly include at least one such feature. Besides, the meaning of "and/or" appearing in the whole text is the same, and it means to include three parallel plans, taking "A and/or B as an example", including plan A, or plan B, or plan A and B. Besides, the various embodiments can be combined with each other, but the combination must be based on what can be achieved by those skilled in the art. When the combination of the embodiments is contradictory or cannot be achieved, it should be considered that such combination does not exist, or is not within the scope of the present application.

The present application provides a shoulder rig.

In some embodiments of the present application, as shown in FIGS. 1 to 6, the shoulder rig includes a main bracket 100 and a battery bracket 200.

One end of the main bracket 100 is provided with two handles 110, an upper side of the main bracket 100 is configured to support a camera, and a lower side of the main bracket 100 is configured to be put on a shoulder.

The battery bracket 200 is movably provided on another end of the main bracket 100, and the battery bracket 200 is configured to install a battery pack.

In the present application, the battery bracket 200 on the main bracket 100 is movable relative to the main bracket 100, such that the battery pack mounted on the battery bracket 200 can move relative to the camera on the main bracket 100. Since the shooting environment of the user is complex and changeable, the user can adjust the position of the battery bracket 200 relative to the main bracket 100 or the camera according to the position of the obstacles in the shooting environment. In this way, the disturbance of the battery pack by obstacles in the environment may be avoided and the camera on the main bracket 100 may be put in the desired shooting position and shooting direction. Meanwhile the user can adjust the shooting position of the camera more conveniently, thereby improving the user experience.

The battery bracket 200 is provided at the end of the main bracket 100. The other end of the main bracket 100 relative to the battery bracket 200 is provided with a handle 110. In other words, the shoulder rig forms a lever, the handle 110 and the battery bracket 200 are equivalent to the stress points at both ends of the lever, and the contact point between the main bracket 100 and the shoulder is equivalent to the fulcrum of the lever. In this way, by adjusting the position of the battery bracket 200 on the main bracket 100, the center of gravity of the shoulder rig may be changed. As a result, the battery pack on the battery bracket 200 can also act as a counterweight to adjust the position of the force bearing points of the shoulder relative to the shoulder rig, enhancing the comfort of users using the shoulder rig.

It should be noted that the battery bracket 200 can be adjusted relative to the main bracket 100 through methods such as rotation, sliding, or a combination of rotation and sliding. When the user adjusts the camera's shooting position, if the battery pack on the battery bracket 200 is disturbed by obstacles in the environment, the position of the battery pack can be adjusted to make the camera in the preferred shooting position. In some embodiments, as shown in FIGS. 1 to 6, the battery bracket 200 is rotatably connected to the end of the main bracket 100. This allows users to conveniently adjust the position of the battery pack and the counterweight of the shoulder rig, ensuring flexible adjustment of the camera's shooting position without disturbance from the external environment, and enhancing the convenience of using the shoulder rig. Furthermore, the camera is mounted on a sliding seat 130, which is slidably installed on a sliding rail 140 on the main bracket 100 to support the camera. In this case, the backside of the main bracket 100 contacts the shoulder, or the backside of the main bracket 100 contacts the shoulder through fixed or sliding shoulder pads.

Specifically, in some embodiments, as shown in FIGS. 1 to 6, the battery bracket includes a first rotary shaft 230, an installation portion 240 and a lock piece 250. The first rotary shaft 230 passes through the installation portion 240, and two ends of the first rotary shaft 230 are fixed to the main bracket 100. The installation portion 240 is rotatable relative to the first rotary shaft 230. That is to say, the first rotary shaft 230 passes through the installation portion 240. The installation portion 240 is provided with a lock groove 245, the first rotary shaft 230 is exposed in the lock groove 245, and the lock piece 250 is movably mounted in the lock groove 245. The lock piece 250 may press the first rotary shaft 230 or loosen the first rotary shaft 230 to have a locked state for locking the first rotary shaft 230 or an unlocked state for loosening the first rotary shaft 230. The installation portion 240 is configured to install the battery pack.

It should be noted that the first rotary shaft 230 is in the lock groove 245, which means that one end of the first rotary shaft 230 enters the lock groove 245 from one side of the lock groove 245, passes through the lock groove 245, and then exits from the other side of the lock groove 245. This configuration allows the first rotary shaft 230 located in the lock groove 245 to be easily pressed and contacted with the pressure plate 252 of the lock piece 250. The same applies to the meaning of the second rotary shaft 243 in the lock groove, as described in the following text.

In this way, when it is necessary to adjust the position of the battery bracket 200, the lock piece 250 is adjusted to the unlocked state, allowing the installation portion 240 to rotate relative to the axial centerline of the first rotary shaft 230 to adjust the battery bracket 200 to the predetermined position. Thus, the lock piece 250 is readjusted to the locked state to secure the first rotary shaft 230. In this state, the lock piece 250, the installation portion 240, the lock groove 245, and the first rotary shaft 230 are all in a relatively stable condition, allowing the battery bracket 200 to regain stability with the main bracket 100. In some embodiments, the first rotary shaft 230 can be fixedly connected to the installation portion 240, with both ends of the first rotary shaft 230 rotatably connected to the main bracket 100. A locking mechanism is set between the main bracket 100 and the first rotary shaft 230. The locking mechanism on the main bracket 100 is used to adjust the rotary connection between the first rotary shaft 230 and the main bracket 100, thereby achieving the adjustment of the position of the battery pack on the battery bracket 200. Alternatively, in some embodiments, gears and a motor are set between the battery bracket 200 and the main bracket 100. The motor drives the gears to rotate, adjusting the relative position relationship between the battery bracket 200 and the main bracket 100.

Figure 2:
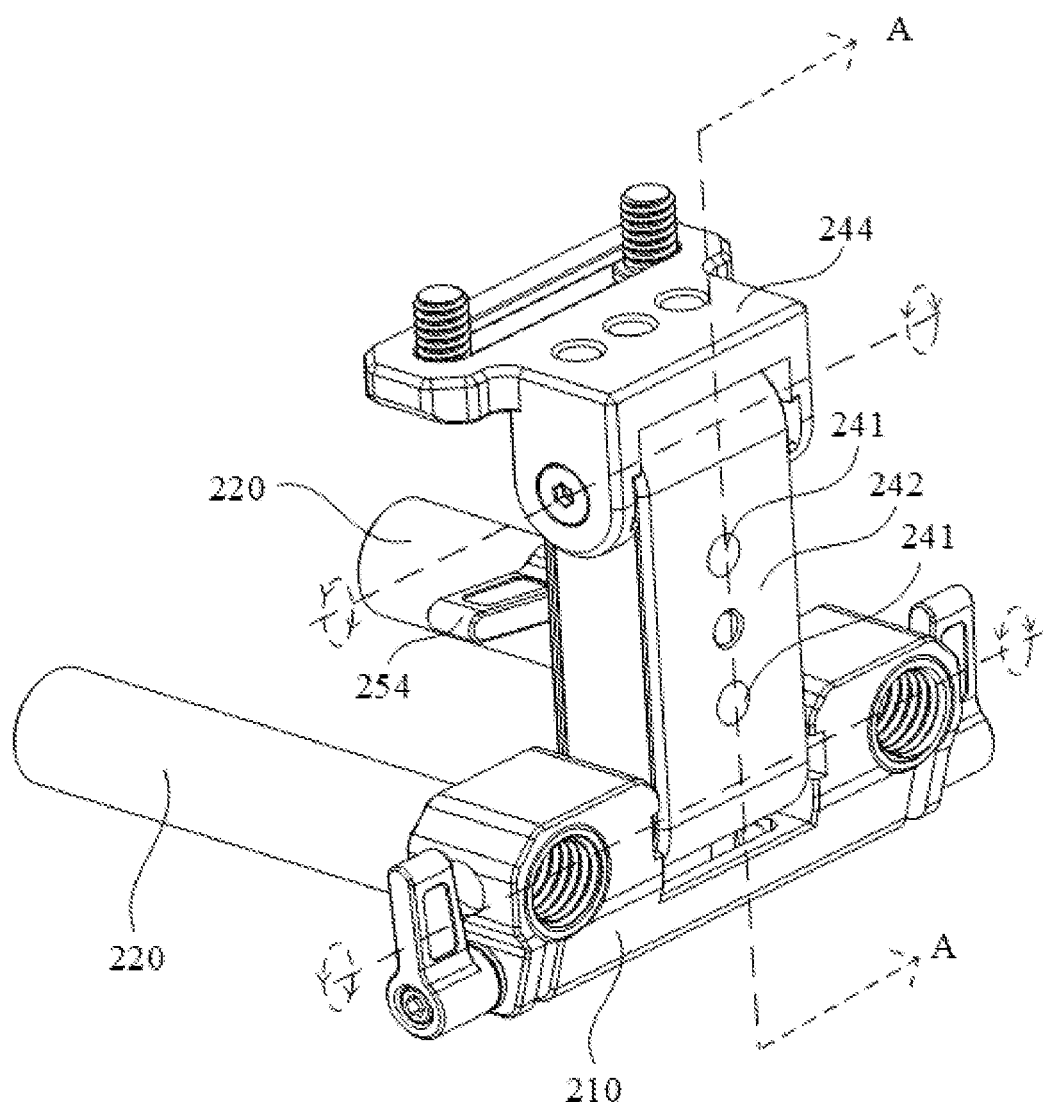
FIG. 2 is a schematic structural view of a battery bracket in FIG. 1.
Figure 3:
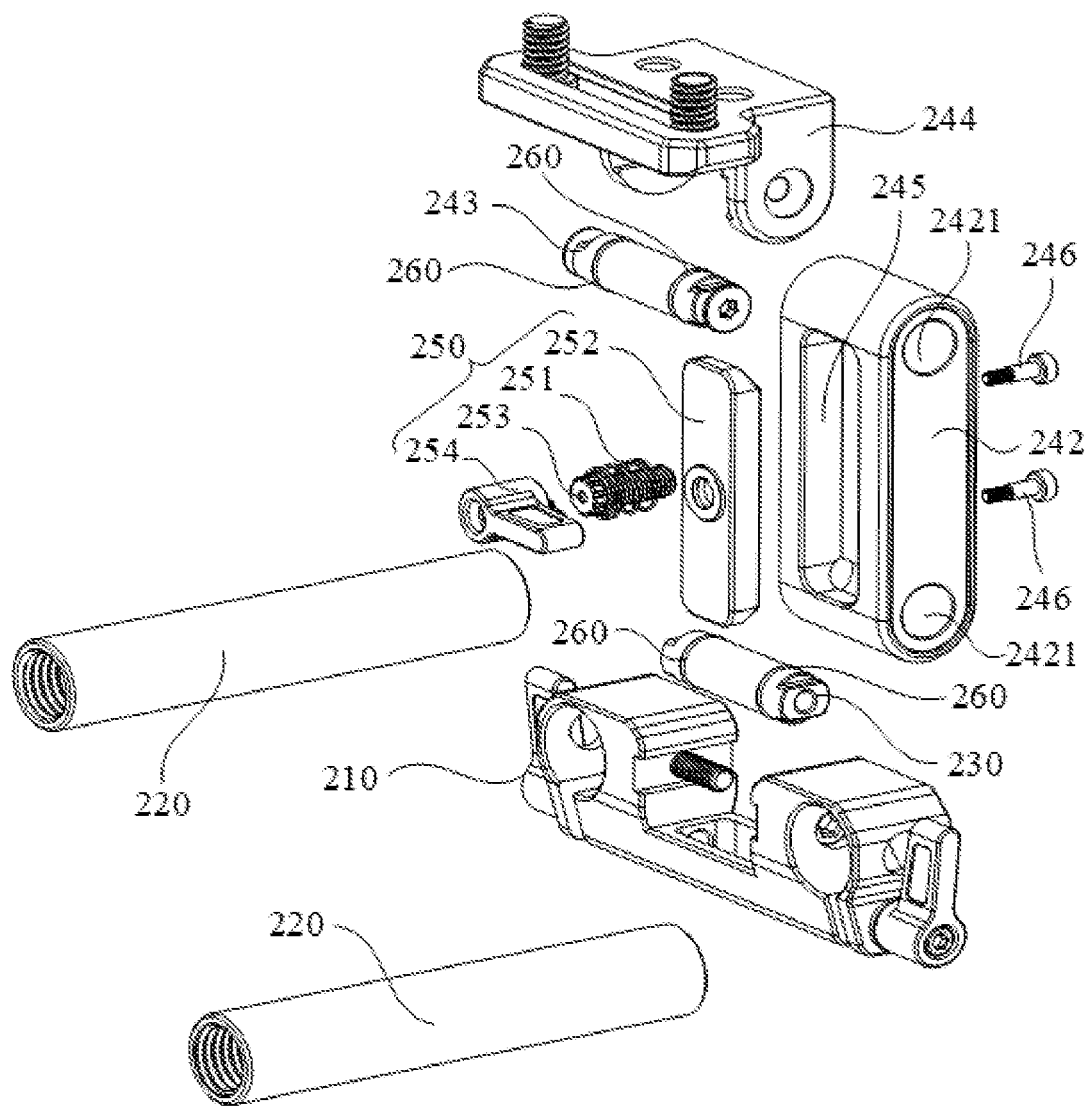
FIG. 3 is a schematic exploded view of the battery bracket in FIG. 2.
Figure 4:
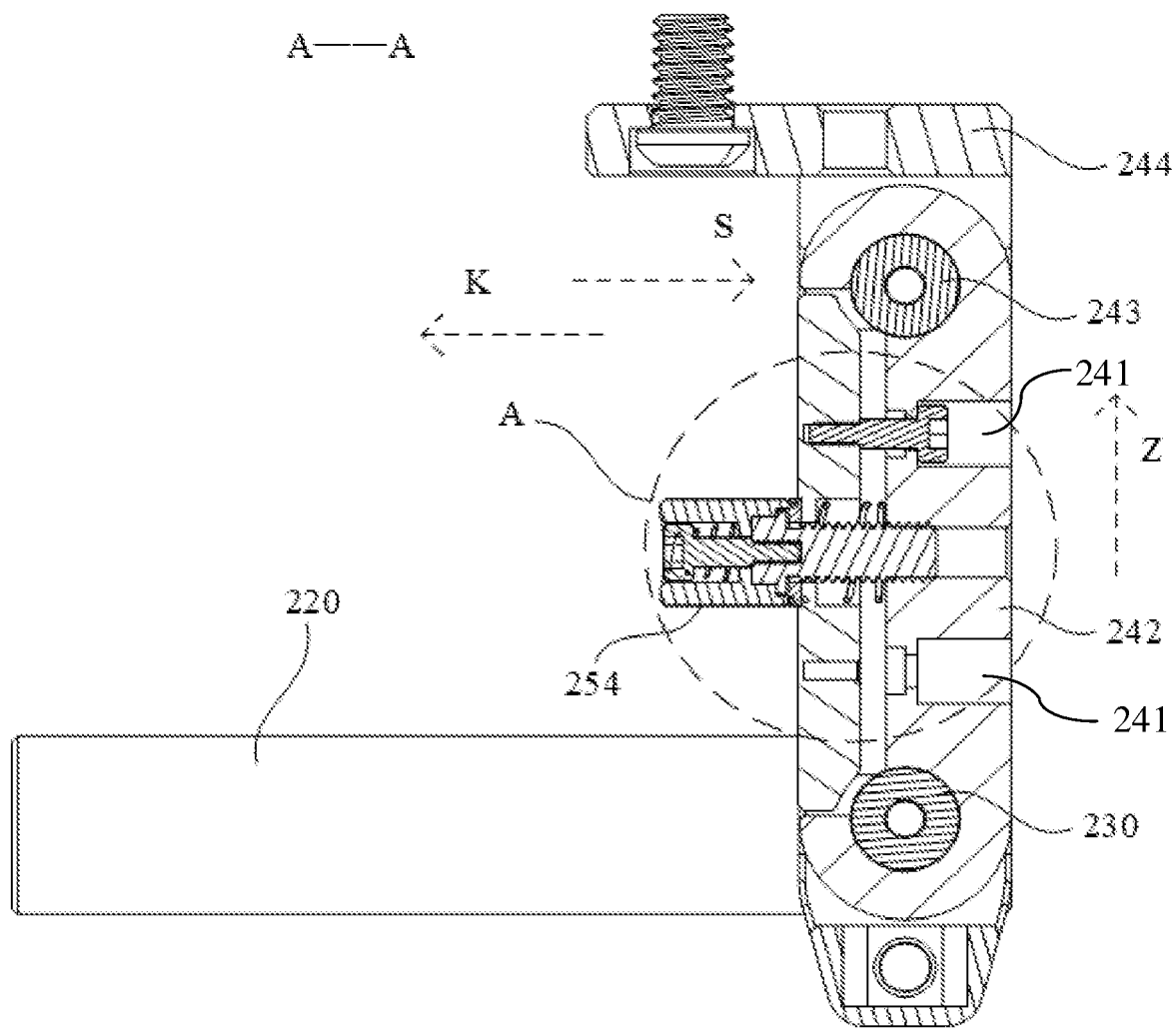
FIG. 4 is a cross-sectional view of the battery bracket along line A-A in FIG. 2.
Figure 5:
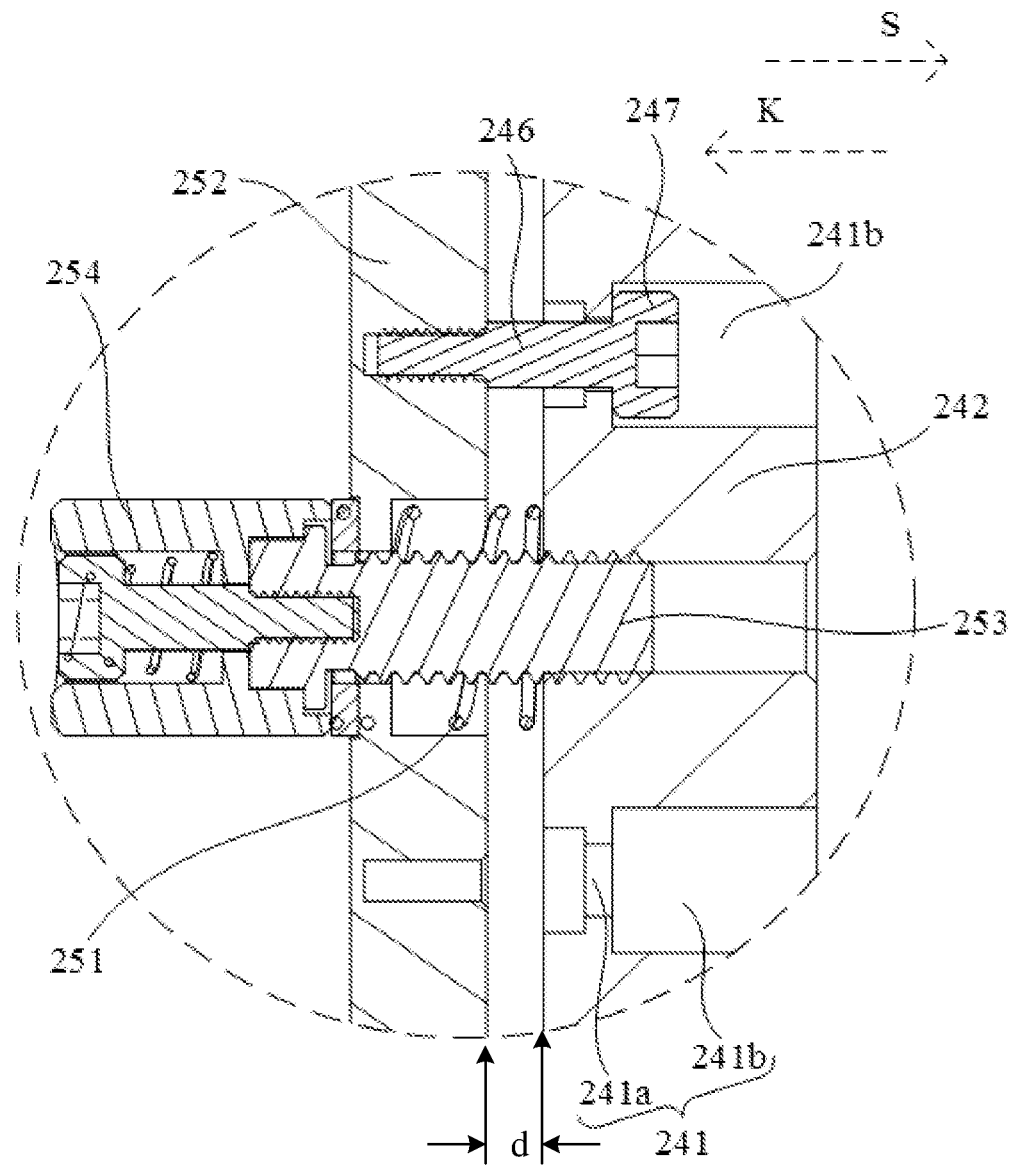
FIG. 5 is an enlarged view at portion A in FIG. 4.
Figure 6:
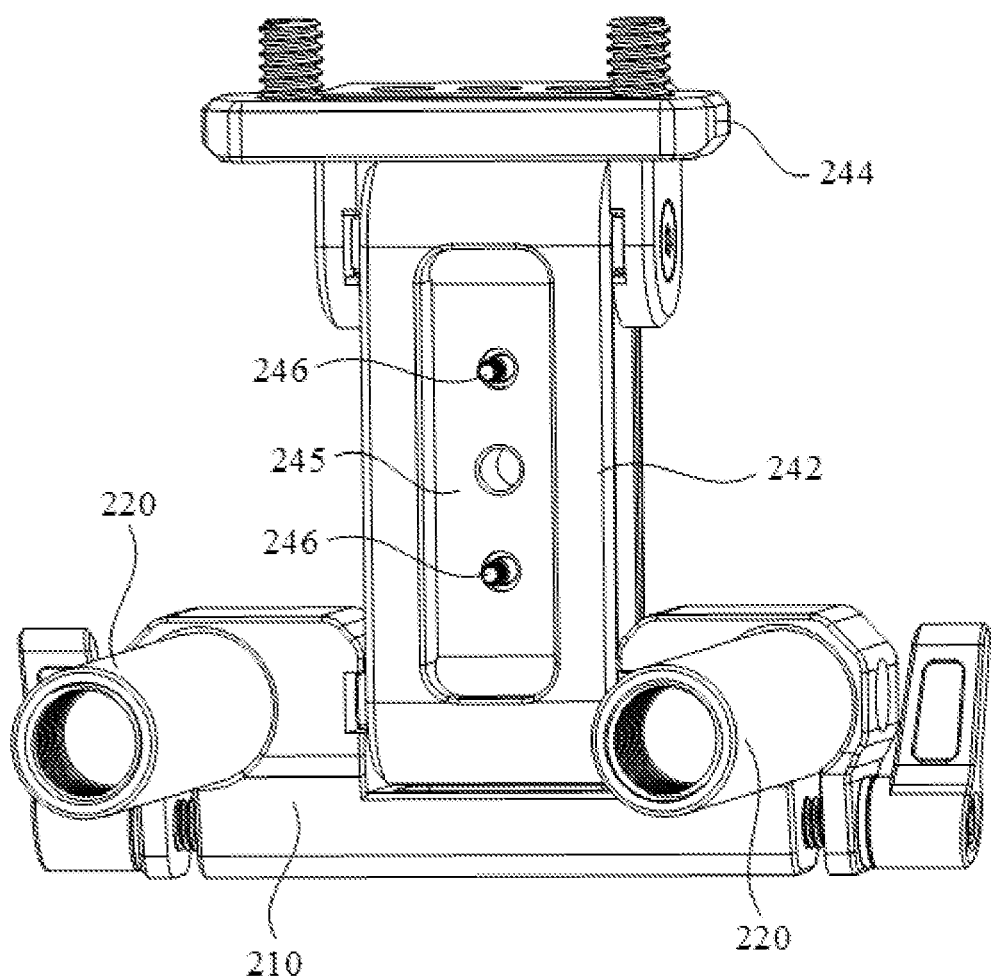
FIG. 6 is a schematic structural view of the battery bracket without a lock piece in FIG. 1.

In some embodiments, as shown in FIGS. 1 to 6, the lock piece 250 includes a pressure plate 252 and a screw rod 253. One end of the screw rod 253 is provided with a knob 254, another end of the screw rod 253 is connected to the installation portion 240 after passing through the pressure plate 252, and the knob 254 is abutted against a side of the pressure plate 252 back away from the installation portion 240. As shown in FIG. 3, FIG. 4 and FIG. 5, the screw rod 253 secures the pressure plate 252 within the lock groove 245. By tightening or loosening the screw rod 253 using the knob 254, the pressure plate 252 can press against the first rotary shaft 230 inside the lock groove 245, making the installation portion 240 unable to rotate relative to the first rotary shaft 230, or the pressure plate 252 can move away from the first rotary shaft 230, allowing the installation portion 240 to rotate relative to the first rotary shaft 230 to adjust the position of the installation portion 240. In the locked state, the pressure plate 252 presses against the first rotary shaft 230 in the S direction, preventing the installation portion 240 from rotating around the axial centerline of the first rotary shaft 230 and keeping the installation portion 240 fixed relative to the main bracket 100. In the unlocked state, the pressure plate 252 can move away from the first rotary shaft 230 in the K direction, no longer making contact with the first rotary shaft 230, thereby allowing the installation portion 240 to rotate around the axial centerline of the first rotary shaft 230 to adjust the position of the installation portion 240. In other words, as shown in FIG. 1 and FIG. 2, the lock piece 250 and the installation portion 240 can both rotate around the axial centerline of the first rotary shaft 230 to adjust the position of the battery pack mounted on the installation portion 240.

It can be understood that when it's necessary to adjust the position of the battery pack, by twisting the knob 254, the screw rod 253 is driven to rotate. This movement causes the screw rod 253 to move in the direction away from the installation portion 240 (K direction), allowing the pressure plate 252 to disengage from the first rotary shaft 230. This allows the installation portion 240 to rotate around the first rotary shaft 230 freely, enabling the battery bracket 200 to be adjusted to the desired position around the axial centerline of the first rotary shaft 230. In addition, by twisting the knob 254 reversely, the screw rod 253 may move close to the installation portion 240, and the move direction is towards the first rotary shaft 230. In this case, the knob 254 presses the pressure plate 252, pushing the pressure plate 252 along the S direction to make contact with and press against the first rotary shaft 230 again, which re-establishes stability between the battery bracket 200 and the main bracket 100. In this way, users can easily control the lock piece 250 to switch between the locked state and unlocked state by manipulating the knob 254, enhancing user convenience. In some embodiments, there may be a push rod between the pressure plate 252 and the installation portion 240. By pushing the push rod, the pressure plate 252 can disengage the first rotary shaft 230. When the user is not manipulating the lock piece 250, the pressure plate 252 remains in contact with and presses against the first rotary shaft 230. When it's necessary to rotate the battery bracket 200, the user can press the push rod to disengage the pressure plate 252 and adjust the position of the battery bracket 200.

In some embodiments, as shown in FIGS. 1 to 6, the lock piece 250 further includes a spring 251. The spring 251 is provided between the pressure plate 252 and the installation portion 240 to make the pressure plate 252 have a tendency to move away from the installation portion and the rotary shaft 230. When the pressure plate 252 is in the unlocked state, the spring 251 makes the pressure plate 252 to reset and move away from the first rotary shaft 230. It can be understood that the two ends of the spring 251 are resiliently abutted against the pressure plate 252 and the bottom wall of the lock groove 245. When the lock piece 250 is in the locked state, the knob 254, through the screw rod 253, pushes against the pressure plate 252, compressing the spring 251, which remains in an elastically compressed state. When it is necessary to switch the lock piece 250 to the unlocked state, by twisting the knob 254, the space between the pressure plate 252 and the installation portion 240 increases, and the spring 251 pushes the pressure plate 252 in the direction away from the installation portion 240, as shown in the K direction in FIG. 4. This movement disengages the pressure plate 252 from the first rotary shaft 230. As a result, the user does not need to control the relative relationship between the pressure plate 252 and the first rotary shaft 230 while rotating the installation portion 240. This makes it easier for the user to rotate the installation portion 240 around the first rotary shaft 230. In some embodiments, the knob 254 and the pressure plate 252 can have magnetic attraction to each other. As the knob 254 moves away from the installation portion 240, this magnetic attraction can pull the pressure plate 252 away from the first rotary shaft 230, enhancing user convenience and the sensitivity of rotating the battery bracket 200.

In some embodiments, as shown in FIGS. 1 to 6, the installation portion 240 is provided with a limiting hole 241. A movable fastening piece 246 passes through the limiting hole 241, one end of the fastening piece 246 is fixed to the pressure plate 252, and another end of the fastening piece 246 is provided with a limiting protrusion 247. The limiting protrusion 247 is positioned on the side of the installation portion 240 back away from the pressure plate 252. When the pressure plate 252 moves in the direction S, the fastening piece 246 also moves synchronously following with the pressure plate 252. In this case, the limiting protrusion 247 is close to the back side of the installation portion 240 away from the pressure plate 252. When the limiting protrusion 247 moves back under the force of the spring 251 and comes into contact with the side of the installation portion 240, the pressure plate 252 remains stationary due to the interaction between the limiting protrusion 247 and the installation portion 240. This position is the extreme limit of the movement of the pressure plate 252 within the lock groove 245. As shown in FIG. 5, in some embodiments, the fastening piece 246 can be a bolt. The threaded section of the bolt passes through the limiting hole 241 and the bolt fits into the limiting hole 241 with a slight gap. The limiting protrusion 247 is configured as a bolt nut. The circular face of the nut on one end of the bolt makes direct contact with the edge of the limiting hole 241. The other end of the bolt has a threaded section that, after passing through the limiting hole 241, screws into the pressure plate 252 to secure the pressure plate 252. Because of the gap between the threaded section of the bolt and the limiting hole 241, the bolt can move along the axis of the limiting hole 241, that is to say the bolt can have a back and forth movement in the Sand K directions as shown in FIG. 5. The distance between the thread section of the bolt and the nut of the bolt determines the displacement of the bolt in the S and K directions. This displacement represents the movement of the bolt in the K direction, it drives the pressure plate 252 to move from making contact with and pressing against the first rotary shaft 230 to a position where the pressure plate 252 disengages and releases the first rotary shaft 230, as shown in FIG. 4. The pressure plate 252 can move within the lock groove 245 in the S and K directions within a distance d, thereby making contact with and pressing against the first rotary shaft 230 as well as moving away from and loosening the first rotary shaft 230.

Furthermore, as shown in FIG. 2 and FIG. 4, there are two limiting holes 241 distributed along the Z direction on the installation portion 240. These two limiting holes 241 are positioned on opposite sides of the screw rod 253, which ensures that both ends of the pressure plate 252 can move smoothly and synchronously. It prevents the pressure plate 252 from rotating and disengaging from the lock groove 245 when the screw rod 253 is not threaded into the installation portion 240. In the configuration described, the fastening piece 246 serves as a connection between the pressure plate 252 and the installation portion 240. Simultaneously, it can be driven by the screw rod 253 to allow the pressure plate 252 to move in the direction of tightening and loosening the first rotary shaft 230, thereby clamping or releasing the first rotary shaft 230.

Specifically, in some embodiments, as shown in FIGS. 1 to 6, the limiting hole 241 includes a connection section 241*a* and a limiting section 241*b*. The limiting protrusion 247 is movably provided in the limiting section 241*b*, an inner diameter of the limiting section 241*b* is greater than an inner diameter of the connection section 241*a*, and a diameter of the limiting protrusion 247 is greater than the inner diameter of the connection section 241*a* and less than the inner diameter of the limiting section 241*b*. As a result, the limiting protrusion 247 moves within the limiting section 241*b*. When the pressure plate 252 reaches a limit position, the limiting protrusion 247 comes into contact with the annular limiting step surface formed between the connecting section 241*a* and the limiting section 241*b*, restricting further movement of the pressure plate 252. From an external perspective, the limiting section 241*b* functions as a recess in the installation portion 240. During the movement of the limiting protrusion 247 along the limiting section 241*b*, the limiting protrusion 247 does not protrude beyond the outer perimeter of the installation portion 240. This design avoids potential damage to the limiting protrusion 247 due to external interference and makes the limiting protrusion 247 stably restrict the extreme range of motion of the pressure plate 252. Certainly, in other embodiments, the limiting protrusion 247 may be exposed on the outer perimeter of the installation portion 240.

In some embodiments, as shown in FIGS. 1 to 6, the installation portion 240 further includes a connection portion 242, a fixation bracket 244 and a second rotary shaft 243. The first rotary shaft 230 and the second rotary shaft 243 pass through the connection portion 242. Two ends of the second rotary shaft 243 are fixed to the fixation bracket 244 and two ends of the first rotary shaft 230 is fixed to the main bracket 100. The lock groove 245 is provided at the connection portion 242, and the second rotary shaft 243 is also provided in the lock groove 245 to make the pressure plate 252 press against the second rotary shaft 243 too. In the locked state, the lock piece 250 locks the second rotary shaft 243 too; and in the unlocked state, the lock piece 250 releases the second rotary shaft 243 too. The fixation bracket 244 is configured to fix the battery pack. It should be noted that the first rotary shaft 230 and the second rotary shaft 243 are located and exposed at opposite ends of the lock groove 245, and the first rotary shaft 230 and the second rotary shaft 243 are parallel to each other. When the pressure plate 252 is inserted into the lock groove 245, it can simultaneously come into contact with and press against both the first rotary shaft 230 and the second rotary shaft 243. This allows for two-dimensional adjustments of the battery pack's position when needed, expanding the range of adjustment for the battery pack. To adjust the position of the battery pack in two dimensions, you can rotate the battery pack by turning the knob 254 appropriately. This action releases both ends of the pressure plate 252 from the first rotary shaft 230 and the second rotary shaft 243 simultaneously. Then, you can move the fixation bracket 244 around the axial centerline of the second rotary shaft 243 to the desired position, move the connection portion 242 around the axial centerline of the first rotary shaft 230 to the preset position, and finally, tighten the knob 254. Such that the pressure plate 252 is pushed to move in the S direction, causing the pressure plate 252 to move toward the first rotary shaft 230 and the second rotary shaft 243 within the lock groove 245 until both ends of the pressure plate 252 simultaneously press against the first rotary shaft 230 and the second rotary shaft 243 inside the lock groove 245. As a result, the position of the connection portion 242 fixed to the first rotary shaft 230 relative to the main bracket 100 is locked, meaning the angle of inclination of the connection portion 242 relative to the main bracket 100 is fixed. Similarly, since the second rotary shaft 243 is also simultaneously pressed by the pressure plate 252, the position of the fixation bracket 244 fixed on the second rotary shaft 243 is also locked. This two-dimensional adjustment of the battery pack's position greatly expands the range of adjustment for the battery pack, making it adaptable to different environmental conditions. Additionally, it provides a broader range for adjusting the center of gravity. Furthermore, the use of a single pressure plate 252 with a single locking mechanism to simultaneously lock and release the first rotary shaft 230 and the second rotary shaft 243 makes the operation simpler and more convenient.

In some embodiments, the second rotary shaft 243 can be fixedly connected to either the installation portion 240 or the connection portion 242. The two ends of the second rotary shaft 243 are rotatably connected to the fixation bracket 244. A locking mechanism is provided between the fixation bracket 244 and the second rotary shaft 243. The adjustment of the rotational connection between the second rotary shaft 243 and the fixation bracket 244 is achieved through the locking mechanism on the fixation bracket 244, which allows for the adjustment of the position of the battery pack on the battery bracket 200. Alternatively, in some embodiments, gears and a motor can be placed between the fixation bracket 244 and the connection portion 242. The motor can drive the gears to rotate, thereby adjusting the relative position between the battery bracket 200 and the connection portion 242.

In some embodiments, as shown in FIG. 3, at least one of the first rotary shaft 230 and the second rotary shaft 243 is sleeved with a damping ring 260, such as, rubber rings, silicone rings, sealing rings and other elastic rings. Each of two ends of the connection portion 242 is provided with a through hole 2421 in the Z direction. After the first rotary shaft 230 and the second rotary shaft 243 pass through the through hole 2421 of the connection portion 242 relatively, the damping ring 260 is abutted against an inner wall of the through hole 2421 of the connection portion 242 to increase the resistance to the rotation of the first rotary shaft 230 and the second rotary shaft 243. When the pressure plate 252 is simultaneously moved away from the first rotary shaft 230 and the second rotary shaft 243 to loosen them, the presence of the damping ring 260 prevents the connection portion 242 and the fixation bracket 244 from automatically slipping and rotating due to gravity. It requires appropriate force to overcome the resistance in order to rotate them. This prevents unnecessary shocks that may occur if the first rotary shaft 230 and the second rotary shaft 243 were to rotate naturally after releasing the pressure plate 252. Alternatively, when it is necessary to adjust only one dimension of the connection portion 242 and the fixation bracket 244, releasing the pressure plate 252 is sufficient. You can then rotate one of them around the axial centerline of either the first rotary shaft 230 or the second rotary shaft 243, and the other will not automatically rotate due to the release of the pressure plate 252. Finally, by re-tightening the pressure plate 252, the connection portion 242 and the fixation bracket 244 can be locked in place again.

In some embodiments, the second rotary shaft 243 is fixedly connected to the connection portion 242, with two ends of the second rotary shaft 243 rotatably connected to the fixation bracket 244. A locking mechanism is installed on the fixation bracket 244 to control the rotation of the second rotary shaft 243. Through the interaction of the first rotary shaft 230 and the second rotary shaft 243, the position of the battery pack can be adjusted while maintaining the stable orientation of the battery pack, thereby preventing damage to the battery pack.

In some embodiments, as shown in FIGS. 1 to 6, the battery bracket 200 also includes a connection tube 220. The end of the main bracket 100 is equipped with the first hoop 120. One end of the connection tube 220 is connected to the installation portion 240, and the other end is inserted into the first hoop 120. In this way, adjusting the clamping position of the first hoop 120 on the connection tube 220 allows for the adjustment of the distance between the battery bracket 200 and the main bracket 100. This adjustment affects the distance from the battery pack to the shoulder pivot point, thereby altering the center of gravity of the shoulder rig, preventing the center of gravity from resting on one point of the user's shoulder for an extended period, and improving the comfort of the user's shoulders. Additionally, when maintenance of the shoulder rig is required, disconnecting the connection between the first hoop 120 and the connection tube 220 allows for the removal of the battery bracket 200.

In some embodiments, as shown in FIGS. 1 to 6, the battery bracket 200 also includes a second hoop 210. The two ends of first rotary shaft 230 is connected to the second hoop 210. One end of the connection tube 220 is inserted into the second hoop 210, and the other end of the connection tube 220 is connected to the main bracket 100. In this way, adjusting the clamping position of the second hoop 210 on the connection tube 220 allows for the adjustment of the distance between the battery and the main bracket 100. This adjustment affects the distance from the battery pack to the shoulders, thereby altering the center of the shoulder rig and preventing the center of gravity from resting on one point of the user's shoulder for an extended period, thus improving the comfort of the user's shoulders. Additionally, when maintenance of the shoulder rig is required, disconnecting the connection between the second hoop 210 and the connection tube 220 allows for the removal of the battery bracket 200.

In some embodiments, as shown in FIGS. 1 to 6, the end of the main bracket 100 is provided with the first hoop 120, and the battery bracket 200 is provided with the second hoop 210. The first hoop 120 and the second hoop 210 are connected to the two ends of the connection tube 220, allowing for better adjustment of the center of gravity position of the shoulder rig and the removal and installation of the battery bracket 200.

This present application further provided a photographic device, which includes a camera and a shoulder rig. The specific structure of the shoulder rig refers to the above-mentioned embodiments. Since this photographic device adopts all the technical solutions from the above-mentioned embodiments, it possesses at least all the beneficial effects brought by the technical solutions of the above-mentioned embodiments, which are not repeated here.

In this device, the camera is positioned above the main bracket 100, and the battery pack that supplies power to the camera is placed on the battery bracket 200. The camera is placed on the user's shoulder through the main bracket 100. The user holds the handle 110 and collaboratively adjusts the camera's shooting direction and positioning with their body. When obstacles in the external environment interfere with the battery pack, the position of the battery pack can be adjusted to prevent changes in the camera's shooting direction and positioning due to the battery pack, which ensures that the camera can be in the desired optimal shooting state, making it convenient for the user to use.

It should be noted that the above are only some embodiments of the present application, and do not limit the scope of the present application thereto. Under the concept of the present application, equivalent structural transformations made according to the description and drawings of the present application, or direct/indirect application in other related technical fields are included in the scope of the present application.

What is claimed is:

1. A shoulder rig, comprising:
   a main bracket, one end of the main bracket being provided with two handles, an upper side of the main bracket being configured to support a camera, and a back side of the main bracket being configured to be put on a shoulder; and
   a battery bracket movably provided on another end of the main bracket, the battery bracket being configured to install a battery pack, wherein:
   the battery bracket is rotatably connected to the main bracket;
   the battery bracket comprises a first rotary shaft, an installation portion and a lock piece;
   the first rotary shaft passes through the installation portion, and two ends of the first rotary shaft are fixed to the main bracket;
   the installation portion is rotatable relative to the first rotary shaft;
   the installation portion is provided with a lock groove, the first rotary shaft is exposed in the lock groove, the lock piece is movably mounted in the lock groove to have a locked state for locking the first rotary shaft or an unlocked state for loosening the first rotary shaft, and the installation portion is configured to install the battery pack;
   the lock piece comprises a pressure plate and a screw rod;
   one end of the screw rod is provided with a knob, another end of the screw rod is connected to the installation portion after passing through the pressure plate, and the knob is abutted against a side of the pressure plate back away from the installation portion; and
   when the lock piece is in the locked state, the pressure plate presses against the first rotary shaft; and when the lock piece is in the unlocked state, the pressure plate releases the first rotary shaft.

2. The shoulder rig according to claim 1, wherein the lock piece further comprises a spring provided between the pressure plate and the lock groove to make the pressure plate have a tendency to move away from the installation portion.

3. The shoulder rig according to claim 1, wherein the installation portion is provided with a limiting hole;
   a movable fastening piece passes through the limiting hole, one end of the fastening piece is fixed to the pressure plate, and another end of the fastening piece is provided with a limiting protrusion;
   the limiting hole comprises a connection section and a limiting section; and
   the limiting protrusion is movably provided in the limiting section, an inner diameter of the limiting section is greater than an inner diameter of the connection section, and a diameter of the limiting protrusion is greater than the inner diameter of the connection section and less than the inner diameter of the limiting section.

4. The shoulder rig according to claim 1, wherein the installation portion comprises a connection portion, a fixation bracket and a second rotary shaft;
   the first rotary shaft passes through an end of the connection portion, and the connection portion is rotatable relative to the first rotary shaft;
   the second rotary shaft passes through another end of the connection portion, two ends of the second rotary shaft are fixed to the fixation bracket, and the connection portion is rotatable relative to the second rotary shaft;
   the lock groove is provided at the connection portion, and the second rotary shaft is exposed in the lock groove;
   when the lock piece is in the locked state, the lock piece locks the second rotary shaft; and
   when the lock piece is in the unlocked state, the lock piece releases the second rotary shaft; and
   the fixation bracket is configured to fix the battery pack.

5. The shoulder rig according to claim 4, wherein the lock piece comprises a pressure plate and a screw rod,
   one end of the screw rod is provided with a knob, another end of the screw rod is connected to the connection portion after passing through the pressure plate, and the knob is abutted against a side of the pressure plate back away from the connection portion; and
   when the lock piece is in the locked state, the pressure plate presses against the first rotary shaft and the second rotary shaft simultaneously; and when the lock piece is in the unlocked state, the pressure plate releases the first rotary shaft and the second rotary shaft simultaneously.

6. The shoulder rig according to claim 4, wherein at least one of the first rotary shaft and the second rotary shaft is sleeved with a damping ring,
   each of two ends of the connection portion is provided with a through hole;
   a damping ring of the first rotary shaft is abutted against an inner wall of a corresponding through hole of the connection portion, and/or a damping ring of the second rotary shaft is abutted against an inner wall of a corresponding through hole of the connection portion; and
   the connection portion is rotatable relative to the first rotary shaft and/or the second rotary shaft.

7. A photographic device, comprising:
a camera; and
the shoulder rig according to claim 1,
wherein the camera is movably provided on the upper side of the main bracket.

* * * * *